A. S. COOK.
Filter.

No. 221,446. Patented Nov. 11, 1879.

Attest:
F. H. Schott.
A. R. Brown.

Inventor:
Alfred S. Cook

UNITED STATES PATENT OFFICE.

ALFRED S. COOK, OF CHICAGO, ILLINOIS, ASSIGNOR OF ONE-HALF OF HIS RIGHT TO MICHAEL GREANEY, OF SAME PLACE.

IMPROVEMENT IN FILTERS.

Specification forming part of Letters Patent No. 221,446, dated November 11, 1879; application filed October 11, 1879.

*To all whom it may concern:*

Be it known that I, ALFRED S. COOK, of Chicago, in the county of Cook and State of Illinois, have invented a new and useful Improvement in Filters, of which the following is a specification.

The object of my invention is to provide a new and useful filter for water and other fluids, which will be effective, and will allow the filtering material to be easily inserted, packed, and adjusted; and it further consists in the particular construction, arrangement, and combination of the parts, hereinafter set forth and described.

Figure 1:
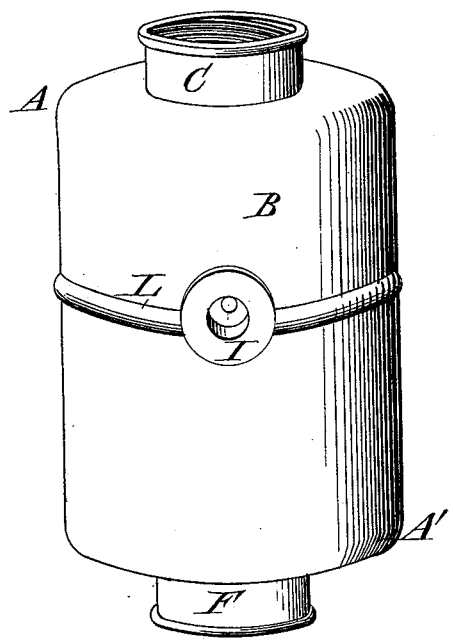
Figure 2:
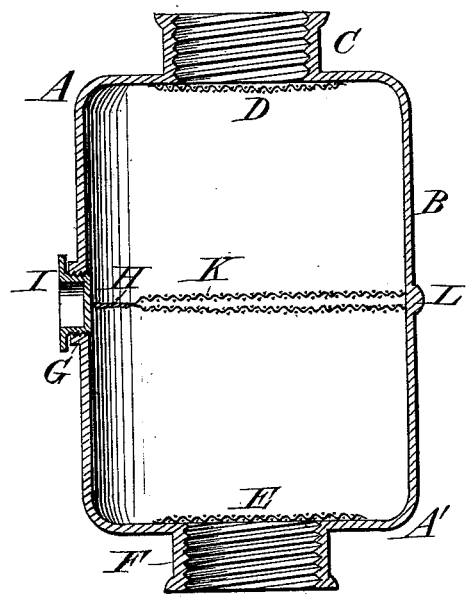
Figure 3:
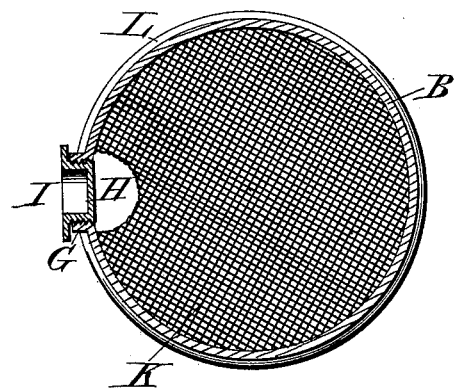

In the accompanying drawings, in which similar letters of reference indicate like parts, Figure 1 is a perspective view of my invention. Fig. 2 is a longitudinal section of my filter. Fig. 3 is a horizontal section, showing the screen-partition K with offset H.

B B are two metal cylindrical shells rounded at the corners. They are secured tightly together at L, in any appropriate manner, and together form the wall of the filter. They are constructed in manner and shape as shown in Figs. 1 and 2.

A A and A' A' are the rounded corners of the cylinder-walls B B. C is a pipe or faucet ring, and is attached to B in any appropriate manner. F is the same as C, and is attached to B at the end of the filter opposite C.

D is a screen, made of woven or perforated sheet metal or any suitable substance, and fastened near the end of the filter adjacent to C. It holds the filtering material within, and also allows the fluid to flow into or from the filtering material and filter as may be desired.

E is the same as D in all respects, with the exception that it is in the opposite end of the filter and adjacent to F.

G is an opening or mouth on one side of the filter. Through it the filter is filled and packed with the necessary filtering material. It is closed tight and secure by means of a head or cover, I, which screws or fastens into it in any appropriate way. G is always on that part of the filter directly over the recess H in K, so that the plane of K will divide it into two equal parts.

K is a double partition wall or screen, made of two finely woven or perforated sheets of metal or any suitable material, the sheets being fastened securely together, so as to form one wall or partition, as shown in Fig. 2. K is provided with a recess, H, on that part directly in front of the opening G, and is secured to the walls B B at or near the center of the filter, so as to divide the filter into two chambers. The construction of K with the recess H and its position as to G allow both chambers to be filled and packed with the filtering material at the same time.

If the pressure requires it, a cloth or any substance can be laid between the two sheets forming the partition K.

My invention is so constructed that the partition K can be placed in any part of the filter, so as to divide it into two chambers; but the opening G must always be in front of the recess H and in the plane of K. Any number of pairs of chambers can be made, if desired.

K can be a single or any number of sheets with offset H, according as the pressure may require.

My drawings show a reversible filter; but my invention can be used also with a non-reversible.

The manner of the operation of my filter is as follows: The filtering material is poured and packed into both chambers of the filter through the opening G. After it is filled and packed, G is closed by the cover or stop I; then C is screwed or fastened on the faucet of the vessel holding the liquid. The fluid is then turned on, and flows through the screen D into the filtering material in the first or upper chamber. The fluid continues to flow, passing through the filtering material until it comes to the partition K, when it is slightly checked in its flow by K long enough to allow the material in the upper chamber to do its work. The fluid forces itself through K into the filtering material in the lower chamber. It flows through said material and through the screen E, and, purified and filtered, it passes out through F to the point desired. The sediment or impurities are collected on the top of the filtering material near the screens D. By reversing the filter and attaching F to the faucet the same process will take place as before, with the addition that the sediment collected at D will be forced out of the filter, which operation can be repeated as often as desired.

Having described my invention, what I claim as new, and desire to secure by Letters Patent, is—

1. The partition K, provided with recess H, in combination with the cylinder B, substantially as described and shown.

2. The combination, in a filter, of a pair of chambers with a division-partition, provided with a recess, whereby both chambers can be filled and packed from the same opening or mouth at the same time, substantially as shown and described.

3. In a filter, the screen K, provided with a recess, H, in combination with mouth G, as described and set forth.

4. A double-sheeted fine-woven metal partition or screen, K, provided with a recess, H, in combination with a filter, substantially as shown and described.

5. The combination, in a filter, of the walls B B, with rounded corners A A A' A', screens D and E, rings C and F, and partition K, provided with a recess, H, mouth G, provided with cover I, substantially as described and set forth.

ALFRED S. COOK.

Witnesses:
HARRY HARRISON,
C. S. HARRISON.